J. T. LINCOLN & J. CORNELL.
MEANS FOR TESTING THE BALANCE OF A PULLEY RUNNING AT A PREDETERMINED SPEED.
APPLICATION FILED MAR. 20, 1911.
1,009,323.
Patented Nov. 21, 1911.
2 SHEETS—SHEET 1.
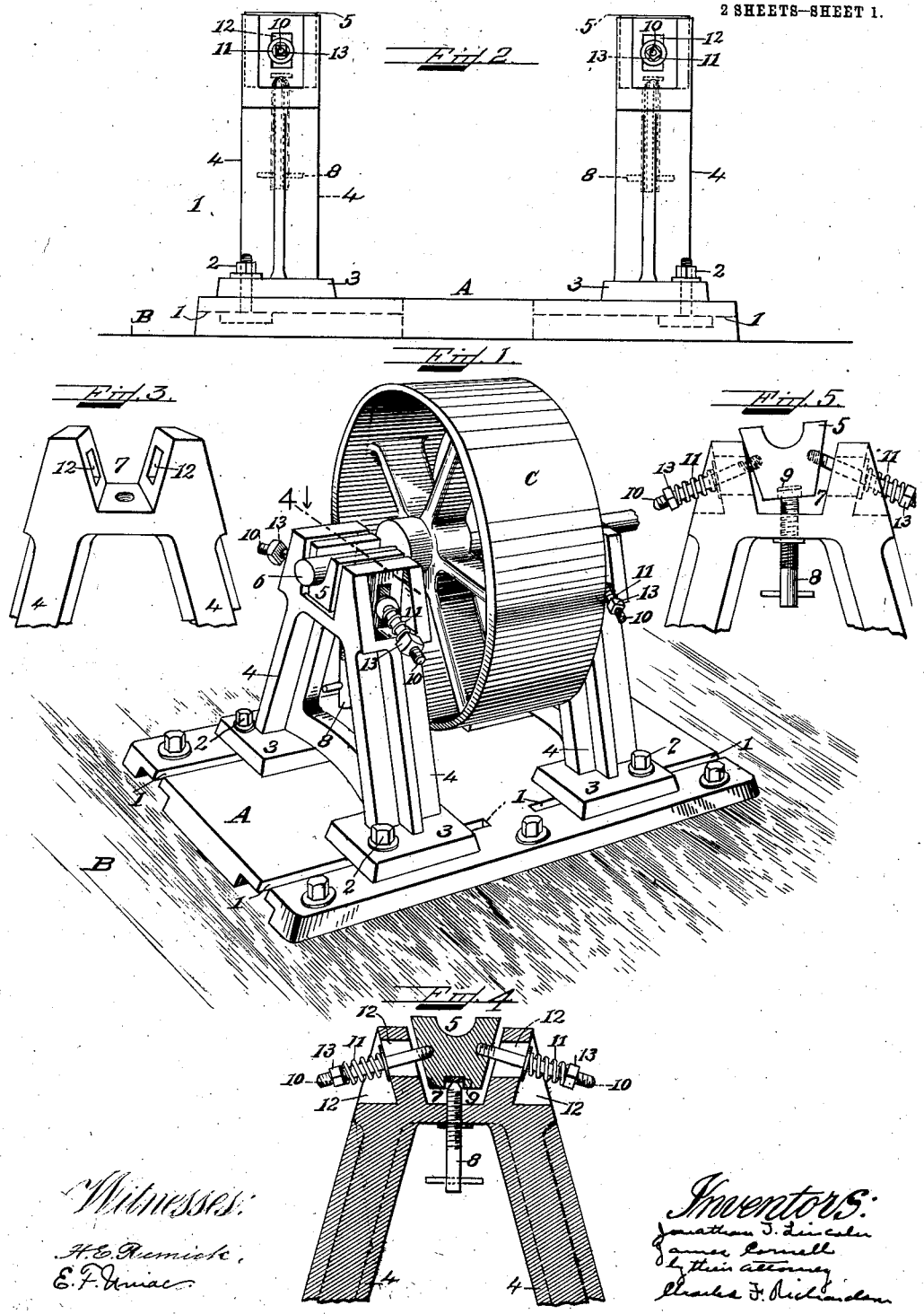

J. T. LINCOLN & J. CORNELL.
MEANS FOR TESTING THE BALANCE OF A PULLEY RUNNING AT A PREDETERMINED SPEED.
APPLICATION FILED MAR. 20, 1911.
1,009,323.
Patented Nov. 21, 1911.
2 SHEETS—SHEET 2.
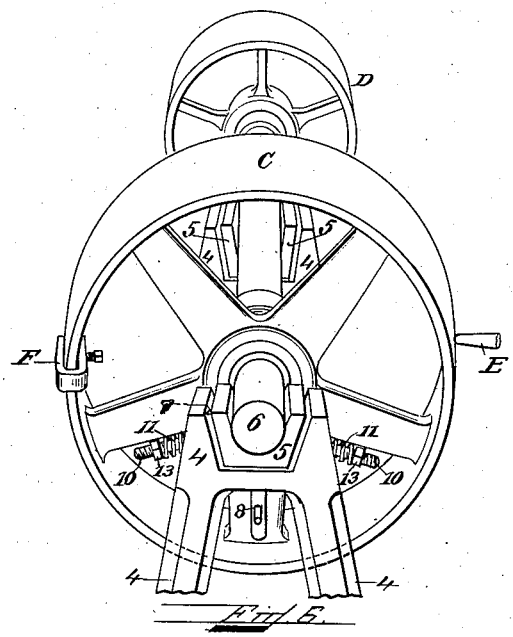
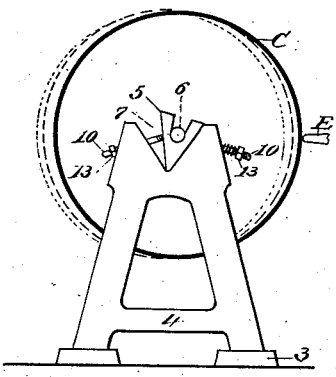 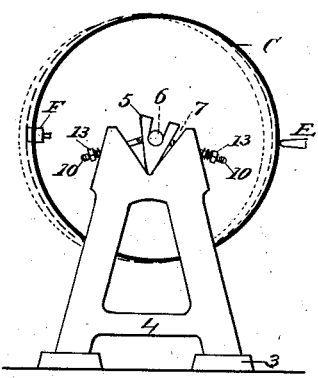 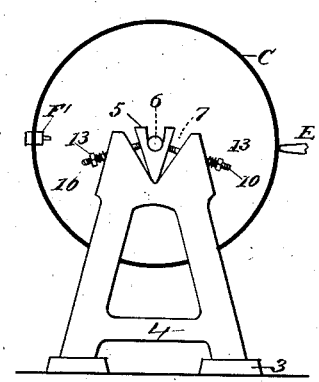
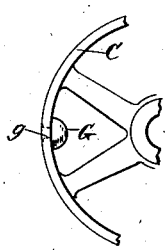

UNITED STATES PATENT OFFICE.

JONATHAN T. LINCOLN AND JAMES CORNELL, OF FALL RIVER, MASSACHUSETTS.

MEANS FOR TESTING THE BALANCE OF A PULLEY RUNNING AT A PREDETERMINED SPEED.

1,009,323.  Specification of Letters Patent.  Patented Nov. 21, 1911.

Application filed March 20, 1911. Serial No. 615,716.

*To all whom it may concern:*

Be it known that we, JONATHAN T. LINCOLN and JAMES CORNELL, citizens of the United States, residing at Fall River, in the county of Bristol and State of Massachusetts, have jointly invented certain new and useful Means for Testing the Balance of a Pulley Running at a Predetermined Speed, of which the following is a specification, reference being had therein to the accompanying drawings.

It has been, and is, common practice, to determine the balance of a pulley, *i. e.* its equilibrium in a plane transverse to the longitudinal axis of the pulley, by allowing the pulley and its arbor to roll slowly on horizontal steel ways; the heaviest side tending to seek the lowest position below the arbor. By the adjustment and fixing of suitable balancing weights in the diametrically opposite portion of the pulley rim, viz. the highest, the pulley becomes apparently balanced; its center of gravity being raised up into the longitudinal axis of the arbor and pulley. This method is known as "still-balancing." But it was often found that notwithstanding a still balanced pulley might run satisfactorily at the comparatively low speeds formerly required, it would not, at what are now termed "high speeds," because it would violently shake its foundations and become a source of danger. Stated in another way, a still-balanced pulley was not necessarily a perfectly balanced pulley; and the problem presented was, to devise apparatus that would indicate whether or not such a pulley, running at the speed required, was balanced, *i. e.* its axis would not vary in position.

The solution which we herewith present, resides in arbor bearings for a pulley, so elastically mounted that they will, by their movement, serve as an indication of the extent to which the pulley is out of balance, and enable the determination of the approximate diametrical plane of the pulley, in which the objectionable moment is acting. By successive chalkings of the outside of the pulley rim, and trial adjustments of temporary weights, on portions of the rim diametrically opposite these marks, a moment about the axis may be formed, equal and opposite to that due to the weight of the pulley, acting through the center of gravity at some unknown distance from said axis. The position and weight of the counterweight to be used, being determined by that temporary weight which brings about uniform rotation, such a counterweight may be substituted, and the pulley become so balanced that it will run evenly at a stated speed. In fine, by the use of our invention one may guarantee that a pulley will run, as required, at the speed desired.

In the drawings illustrating the principle of our invention, and the best mode now known to us of embodying the same in operative structure, Figure 1 is a perspective view of our invention, there being mounted therein a pulley to be tested. Fig. 2 is a side elevation of our invention. Fig. 3 is a perspective view of the head of one of the standards, without its elastically mounted bearing. Fig. 4 is a transverse vertical section on line 4—4 in Fig. 1, showing the head, and bearing elastically mounted in the head; the structure being in normal position. Fig. 5 is an elevation of head and bearing; the bearing being out of normal position. Fig. 6 is a perspective view showing a pulley, chalked, and balanced by a temporary counterbalancing weight; the pulley being assumed to be running at speed. Figs. 7, 8 and 9 are diagrammatic views, in elevation, to illustrate various stages through which a pulley passes from unbalanced to balanced condition. Fig. 10 is a similar view of a fragment of a pulley having a permanent mushroom counterweight.

The speed balancing mechanism for testing pulleys, shown in Figs. 1 and 2, is adjustably mounted upon a cast iron table A that may be secured to a suitable foundation B, as a pier of concrete, or proper flooring. The table has parallel longitudinal lock slots 1, 1, arranged at proper distances apart, to receive lock bolts 2, 2, that pass through feet 3, 3, of a heavy cast iron frame work comprising two standards 4, 4. These standards are, by means of two bearing blocks 5, 5, adapted to receive and support a balanced arbor 6, upon which is removably mounted the pulley C to be tested. These bearing blocks are mounted in channels 7, 7, formed in longitudinal alinement, in the top portions of the two standards 4, 4; the blocks and their respective channels being in cross section, preferably, inverted truncated isosceles triangles, in order that the center of gravity of each bearing block may be nearer that of the balanced arbor to be mounted in the bearing. That these bearings may have limited movement in planes transverse to the longitudinal axis of the arbor, each is pivotally mounted upon a vertical adjusting screw 8 in the base of the channel 7; the point of the screw engaging a steel plate 9, Fig. 4, in a seat centrally located in the base of the bearing block; and is retained in a normally upright position, in parallelism, but out of contact, with its respective channel, by two balancing studs 10, 10, arranged at substantially right angles to the longitudinal axis of the arbor bearing block, and provided with spiral springs 11, 11, of suitable strength; one end portion of each stud passing through its slot 12 in the side portion of the head, and screwed into its adjacent side of the bearing block; while the other end portion, by means of a nut 13, engages the spiral spring 11 mounted on the stud but confined between the nut and the outside portion of the head. The frames, base and bearing having now been described, the arbor with the pulley to be tested, may, by suitable apparatus, be swung and lowered into the bearing blocks, and a driving pulley D, Fig. 6, be fixed to the arbor, and power supplied in any well known manner, to give the pulley the number of revolutions required of it in actual use.

We will now explain the operation of the principal feature of our invention, reference being had particularly to Figs. 7, 8 and 9. Power is applied through the driving pulley D, and, if the pulley C is unbalanced, the bearing box 5 will move from side to side, as appears in Fig. 7, in solid and in dotted lines; the violence of those movements being prevented by the alternate compression of the springs 11, upon the studs 10. In order to determine the heaviest side of the pulley, a piece of chalk E is pushed toward the pulley rim, until it just touches that portion of the rim swinging in the greatest circle. The power is disconnected, and upon the stoppage of the pulley, one of a number of temporary counterweights F, Figs. 6 and 8, of various predetermined weights, is selected and secured to that portion of the rim substantially opposite to that chalk-marked, this counterweight being U shaped and provided with a screw in one of its legs to engage the inside of the pulley rim. The pulley C, Fig. 8, with this temporary counterweight F is again set in motion, and the oscillations of the bearing box from side to side are noted; and the heaviest side, if any, is determined by the above mentioned method of chalking the rim. Another counterweight F', Fig. 9, heavier than the first is selected and adjusted to the rim substantially opposite the chalk mark, and the pulley once more started. If the last counterweight F' is of the desired weight, and is so placed as to form a moment equal and opposite to that due to the weight of the pulley acting through the natural center of gravity of the pulley, the bearing will stand stationary in its normal position, and the chalk-mark will be continuous. If the last counterweight does not bring about the balance desired, further selections and adjustments of counterweights must be made, until the pulley appears to be perfectly balanced. When the pulley is thus balanced, a permanent counterweight G, Fig. 10, so designed as to be the equivalent of the clamp in position on the rim of the pulley, is substituted. It is a mushroom shaped weight, and its shank $g$ is inserted into a hole bored in the rim where the temporary weight engages the rim, and is there secured by heading over the free end portion of the shank. In fine, many still-balanced pulleys are, as a matter of fact, unbalanced; consequently they cannot be guaranteed to be balanced, until tested, and corrected under actual working speeds. By the use of our invention, they can be guaranteed.

Desiring to protect all the features of our invention in the broadest manner legally possible, what we claim is:—

1. A pair of journal bearings, to sustain a balanced arbor and a pulley mounted thereon; a support for each bearing; a pivotal member in the support, to sustain the bearing; spring members engaging the support and the bearing on opposite sides, tending to hold, yet permit the bearing to be moved, in a plane transverse to the longitudinal axis of the arbor.

2. A pair of journal bearings, to sustain a balanced arbor and a pulley mounted thereon; a support for each bearing; said support having a channel to receive said bearing; a pivot in the bottom of the channel to sustain said bearing; two rods secured to two opposite sides of the bearing, and passing through the walls of the channel and the sides of the support; and springs on said rods tending to hold said bearing in normal position.

In testimony whereof we affix our signatures in presence of two witnesses.

JONATHAN T. LINCOLN.
JAMES CORNELL.

Witnesses:
RICHARD P. BORDEN,
HENRY N. CURRAGHER.